May 8, 1928.

P. E. DUTCHER

EYESHIELD

Filed Oct. 23, 1924

INVENTOR
Pierpont E. Dutcher
BY
his ATTORNEYS

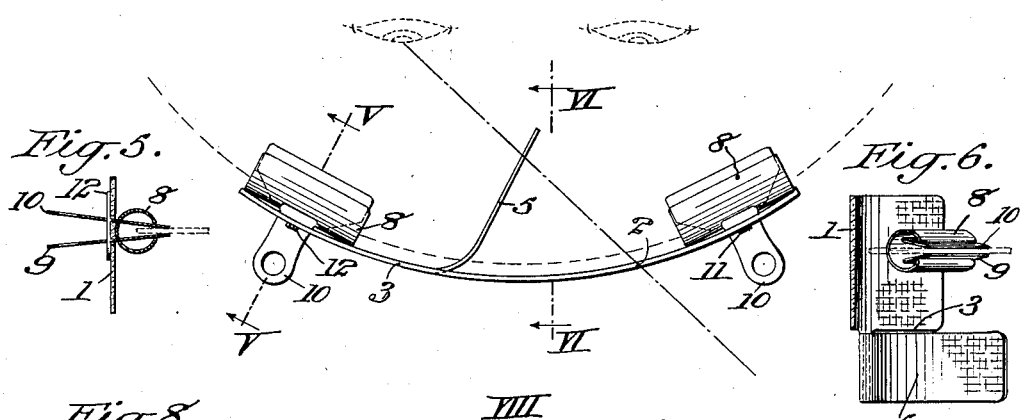
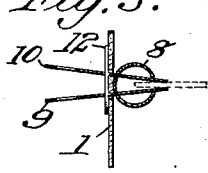
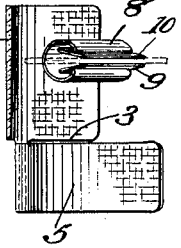
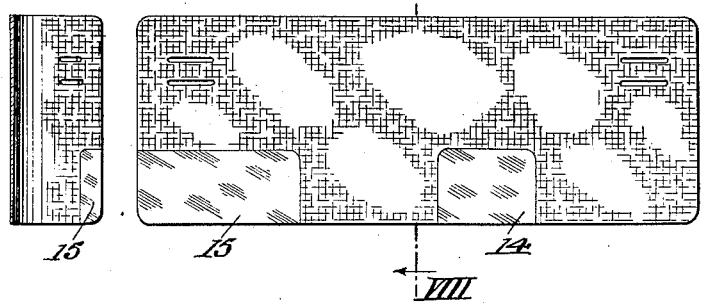
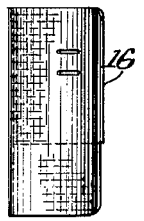
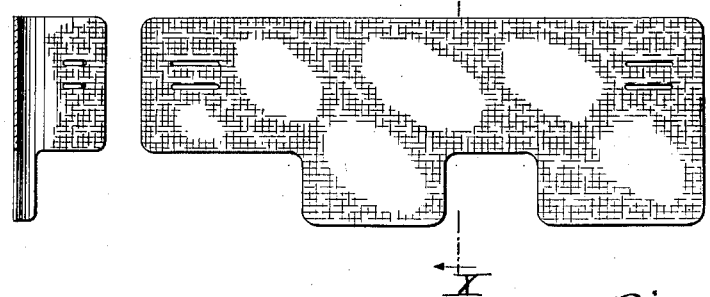

Patented May 8, 1928.

1,669,043

UNITED STATES PATENT OFFICE.

PIERPONT E. DUTCHER, OF UPPER MONTCLAIR, NEW JERSEY.

EYESHIELD.

Application filed October 23, 1924. Serial No. 745,428.

This invention relates to an eye shield and, more particularly, to an appliance for use in night driving to eliminate the discomfort and danger arising from the glare of headlights of oncoming vehicles.

The invention has for an object to provide such a device which will protect the driver from the glare, and especially from the so-called "blind spot" of oncoming lights, while permitting him, at the same time, to have a clear view of the path which the car he is driving is about to travel.

Another object consists in providing such a device which is adapted, by movements of the wearer's head, to permit an entirely clear vision in all directions; to provide a dim vision in the line of an oncoming vehicle simultaneously with an unobstructed view of the path to be taken by the vehicle of the wearer; and to provide a dim vision in all directions ahead.

Another object consists in providing such a device which is adapted to afford varying degrees of dimness of vision.

Another object consists in providing such a device which protects from the side ray of a vehicle light about to pass the vehicle of the wearer, as well as from front rays of oncoming vehicles.

Another object consists in providing such a device which is detachable whereby it may be removed and put out of sight when not in use.

Another object consists in providing such a device which is expeditious, cheap and simple to manufacture, and which is adapted to be fashioned so as accurately to fit the vision of different persons.

Another object consists in providing certain improvements in the form, construction, material and arrangement of the several parts, whereby the above named and other objects may effectively be attained.

A practical embodiment of the invention is represented in the accompanying drawings, in which Fig. 1 represents a front view of the device applied to a hat, portions of the hat and face of the wearer being shown in dotted lines.

Fig. 4 represents a top plan view of the device in the position it would occupy on the hat of the wearer, the eyes of the wearer and a portion of the hat brim being shown in dotted lines.

Fig. 5 represents a section taken in the plane of the line V—V of Fig. 4, looking in the direction of the arrows.

Fig. 6 represents a section taken in the plane of the line VI—VI of Fig. 4, looking in the direction of the arrows.

Fig. 7 represents a plan view of a modified form of the body portion of the device.

Fig. 8 represents a section taken in the plane of the line VIII—VIII of Fig. 7, looking in the direction of the arrows.

Fig. 9 represents a view similar to Fig. 7 showing another modified form.

Fig. 10 represents a section taken in the plane of the line X—X of Fig. 9, looking in the direction of the arrows.

Fig. 11 represents an end view of another modified form of the body portion of the device, in the position it will assume on the hat of the wearer.

Figure 1:
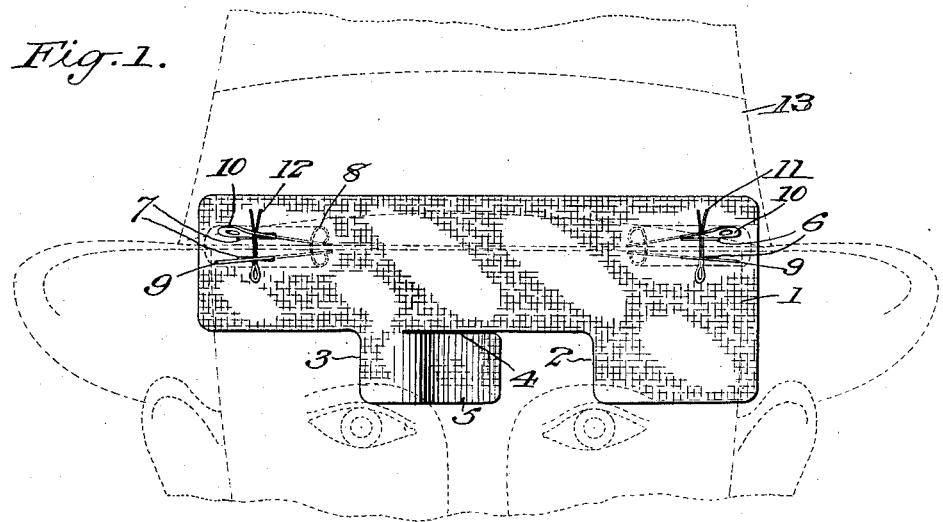

An eye shield which is wholly somewhat opaque is not satisfactory for the purpose to which my invention is dedicated because, if it is sufficiently opaque to provide the necessary protection from the rays of oncoming lights, it so greatly dims the vision of the path the wearer's vehicle is about to travel as largely to obscure such path and make driving dangerous. My invention recognizes this fact and, while providing adequate protection from oncoming lights, does not at all dim the wearer's view of the path along which he is guiding his vehicle.

Referring to the preferred form shown in Figs. 1 to 6 inclusive, the shield comprises a body 1 which may be composed of any suitable material, though I prefer a non-inflammable celluloid, or the like, because this material is easily handled in manufacturing, is cheap, safe, bendable and not fragile, and may readily be colored to the desired degree of opacity.

Preferably the celluloid body is, in course of manufacture, tinted to an amber or other suitable shade which will provide sufficient protection for the purpose described.

The lower portion of the body 1 is cut away at two places so as to form a pair of openings 2, 3. The opening 2 is intended for the left eye and the opening 3 for the right eye.

Between the two openings, the body 1 is slit, as indicated at 4 to provide a tongue 5 which is bent inwardly in such a direction as to project toward the left hand side of the nose of the wearer. This arrangement is well shown in top plan view in Fig. 4.

The upper portion of the body 1 has two pairs of slits 6, 7, each pair being fitted to receive the handles of a spring clamp.

These clamps may consist of ordinary paper clamps of well known form having a spring metal body member 8 and a pair of operating handles 9, 10; and they may be secured in position on the body 1 of the device by cotter pins 11, 12 that pass through the handles 9, 10.

Figure 2:
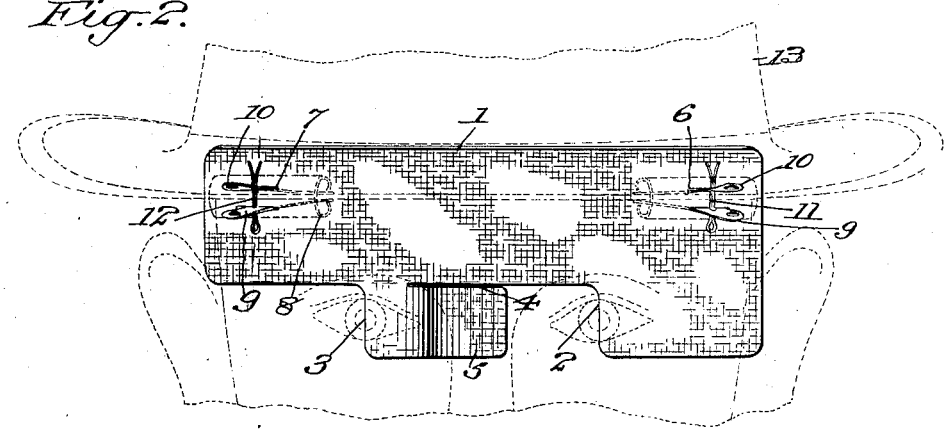
Fig. 2 represents a similar view with the head of the wearer in a different position.
Figure 3:
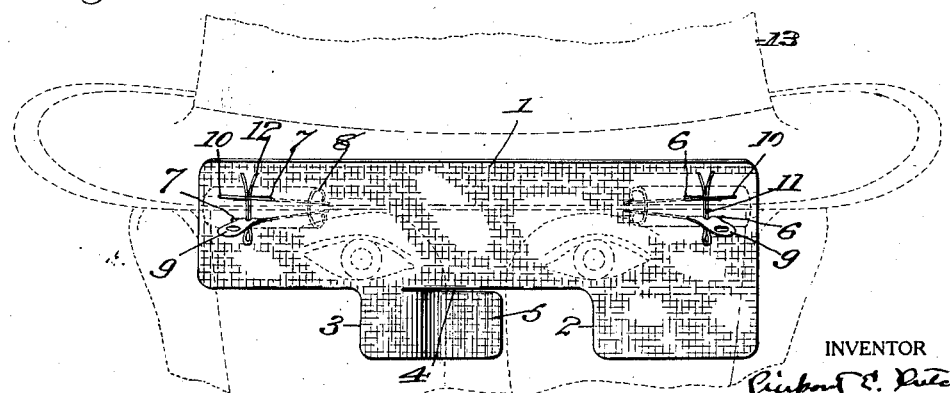
Fig. 3 represents a similar view with the head of the wearer in a third position.

The hat of the wearer of the device is marked 13, and it will be seen that, by the aid of the spring clamps, the device may readily be removably attached to the brim of the hat, as clearly represented in Figs. 1, 2 and 3. In this attaching operation the body 1 will naturally be curved so as to substantially conform to the curvature of the brim, as indicated in Fig. 4.

By preference, the part of the body 1 above the edge 4 is more opaque than the lower portion, and this result may be accomplished in several ways. It is my choice to have the material of a uniform color throughout, but to make this portion above the edge 4 thicker than the remainder so as to obtain the effect of less transparency. This arrangement will cause the body 1 to be slightly tapered from its top to its bottom edge, as represented in Fig. 6. This greater thickness of the upper portion is also intended to be indicated by the heavier character of the shade lines above the edge 4.

In applying the device to the hat, it should be so adjusted that the vertical edge of the opening 2 is in line with the eyeball of the left eye, and the vertical edge of the opening 3 takes a corresponding position in relation to the right eye. If this fine adjustment is not readily obtained when the device is clipped on to the hat, it may easily be accomplished by a slight twisting of the hat thereafter.

Of course, it frequently happens that the eyes of different persons are different distances apart, and so I prefer to make the device of such size that the spacing of the vertical walls of the openings 2, 3 will accommodate the average person. When the device is first applied, the wearer should adjust it so that the vertical wall of the opening 2 is in line with the eyeball of the left eye. This can easily be done by closing the right eye and sighting with the left. With the device in this position, the left eye is closed and the right eye opened. If, under these circumstances, the vertical wall of the opening 3 overlaps the eyeball of the right eye, the said wall may be trimmed away with a knife until it is in proper alignment with the eyeball of the right eye. If, on the contrary, the vertical wall of the opening 3 appears to be an appreciable distance to the left of the eyeball of the right eye, the vertical wall of the opening 2 may be trimmed away with a knife, and the device, as a whole, moved laterally toward the right eye until the vertical wall of the opening 3 is in proper position with respect to the right eyeball. By this simple expedient, therefore, the device may be exactly adjusted to any wearer and, thereafter it will fit him just as an individual pair of eye glasses or spectacles fits the owner.

After the device has been properly adjusted so that the vertical walls of the openings 2 and 3 are in line with the two eyeballs, the hat is adjusted on the head of the wearer so that, in normal driving position, the eyes will look under the body 1 and have a clear vision in all directions ahead. This position is shown in Fig. 1 of the drawings.

Now, when the headlights are seen approaching, the head of the wearer is tilted forward slightly so as to bring the lower edge of the body 1 below the eyes. In this position the downwardly projecting portions of the body 1 will protect the eyes from the oncoming rays of light which are, necessarily, slightly to the left of the wearer while, at the same time, the openings 2, 3 will enable the wearer to look, with an unobstructed view, along the right hand side of the road and the path which he is about to travel. This position is shown in Fig. 2 of the drawings.

It will be observed, by reference to Fig. 2 and Fig. 4, that the tongue 5 projects inwardly to a position at the left side of the front of the nose and thus effectively shields the right eye from the side rays of the lights of the oncoming vehicle as it is about to pass the wearer's vehicle. This is diagrammatically represented by the dot and dash line on Fig. 4 projecting from the right eyeball past the vertical wall of the opening 2, and traversing the tongue 5. The curvature of the body 1 as a result of conforming to the hat, shown in Fig. 4, serves to protect the left eye from such side rays.

In case it is desired to thoroughly protect the vision from all front light as, for instance, when passing over the crest of a hill and encountering lights on a vehicle coming up the hill, the wearer simply has to tilt his head further forward until the edge 4 is below both eyes. In this position both eyes are looking through the upper portion of the body 1 which is, as previously mentioned, preferably more opaque than the lower portion. This position is shown in Fig. 3 of the drawings.

Thus it will be seen that, once the device is trimmed to proper size and adjusted, it is only necessary for the wearer to make a slight movement of his head in order to have no effect whatever from the shield, or protection from oncoming headlights with a clear view of his own path, or complete protection from all light in front. This covers all eventualities, and the adjustment and use of the device will become very simple after a slight period of experience.

When the device is not desired for use, it may be removed from the hat and put in a pocket or other convenient place, just as a pair of goggles would be carried or stored.

The device may be attached to any ordinary form of hat or cap, or it may be secured to a head frame somewhat like a vizor or eye shade, and it is desired to secure the device so that it hangs down in a substantially vertical position.

Referring to the modified form shown in Figs. 7 and 8, I would say that it is the same as the preferred form, except that the openings 2, 3 are replaced by wholly transparent portions 14, 15. Thus there is no opening whatever at either of these places. Furthermore, the inwardly projecting tongue 5 is omitted. This form of the device is adjusted and operated in the same way as the preferred form.

Referring to the modified form shown in Figs. 9 and 10, it is the same as the preferred form, except that the inwardly projecting tongue 5 is omitted. This modified form is adjusted and operated in the same manner.

Referring to the modified form shown in Fig. 11, it is intended to be like any of the forms above described except that, instead of forming the body 1 of material which is tapered so as to be thicker in the upper portion than in the lower portion, the material is originally of uniform thickness, but is made thicker above the part indicated by the edge 4 by folding the material over upon itself, as denoted at 16.

It may be said, generally, that, instead of thickening the upper portion of the body 1, the desired result of greater opacity here may be obtained by shading the coloring of the material so as to make it a deeper color in the upper portion.

The construction of the device has been described for use in countries where vehicles pass to the right, but it will be apparent that the same invention may be employed in localities where it is customary to pass to the left, by simply reversing the positions of the openings 2, 3 and tongue 5, in the preferred form, and by reversing the position of the parts corresponding to the openings 2, 3 in the modified forms.

It will be understood that various changes may be resorted to in the form, construction, material and arrangement of the various parts without departing from the spirit and scope of my invention; and hence, I do not intend to be limited to the details herein shown and described, except as they are included in the claims.

What I claim is:—

1. An eye shield of integral construction adapted to be secured to the brim of a hat or the like at a distance from the eyes of the wearer, and comprising a flexible body, said body including a horizontally disposed light resisting area and two downwardly projecting light resisting areas having substantially vertical boundaries, a corresponding boundary of each last named area being located in the line of direct forward vision of each eye, horizontally considered, but being arranged to be worn normally above said line, whereby the wearer's direct forward vision is normally unobstructed but may be shielded laterally by tilting the head slightly, and wholly by tilting the head further.

2. An eye shield comprising a wall adapted to be supported above and to extend downwardly in front of an observer's eyes and provided with a pair of openings opening through the lower edge of the wall so spaced and placed as to create the illusion of a single opening when placed a short distance before the eyes of the observer, and means for supporting said shield over the forehead above the eyes where it is normally out of the line of vision and may be brought into the line of vision by tilting the head forwardly.

In testimony that I claim the foregoing as my invention, I have signed my name this 20th day of October, 1924.

PIERPONT E. DUTCHER.